United States Patent [19]

Katzer et al.

[11] 3,735,777
[45] May 29, 1973

[54] AUTOMATIC VALVE

[75] Inventors: Johannes Katzer; Franz Lopic, both of Neu-Ulm, Germany

[73] Assignee: Kupex AG, Gearus, Switzerland

[22] Filed: Jan. 24, 1972

[21] Appl. No.: 220,220

[30] Foreign Application Priority Data

Jan. 28, 1971 Germany..................P 21 03 948.5

[52] U.S. Cl. ..........137/514.5, 137/516.29, 137/517, 137/536, 137/540, 251/DIG. 1
[51] Int. Cl................................................F16k 17/04
[58] Field of Search..................137/460, 514, 514.3, 137/514.5, 514.7, 516.25, 516.27, 516.29, 517, 498, 536; 251/DIG. 1

[56] References Cited

UNITED STATES PATENTS

| 955,043 | 4/1910 | Barr et al........................137/514.7 |
| 2,509,880 | 5/1950 | Pelton ............................137/514.7 X |
| 2,968,315 | 1/1961 | Fisher................................137/517 |
| 3,142,473 | 7/1964 | Mercier........................137/514.7 X |
| 3,472,275 | 10/1969 | Castro et al. ....................137/498 X |
| 3,605,802 | 9/1971 | Hertell .............................137/514.5 |

Primary Examiner—Alan Cohan
Assistant Examiner—David J. Zobkiw
Attorney—Granville M. Brumbaugh, Eben M. Graves, Mark N. Donohue et al.

[57] ABSTRACT

An automatic valve in which a valve body is located in a central chamber of a housing and fluid flow is directed through passages of progressively decreasing flow area formed between the valve body and the inside wall of the housing, thereby causing throttling of the flow in the chamber. A spring acting on the valve body balances the resulting pressure differential between the upstream and downstream sides of the valve body to hold the valve body in an open position during normal fluid flow. Should the flow exceed a predetermined amount, the pressure differential exceeds the force of the spring and the valve body moves to a closed position, shutting off flow through the system. To prevent an abrupt shutoff of the fluid flow, a damping device is provided for limiting the closing speed of the valve body.

19 Claims, 5 Drawing Figures

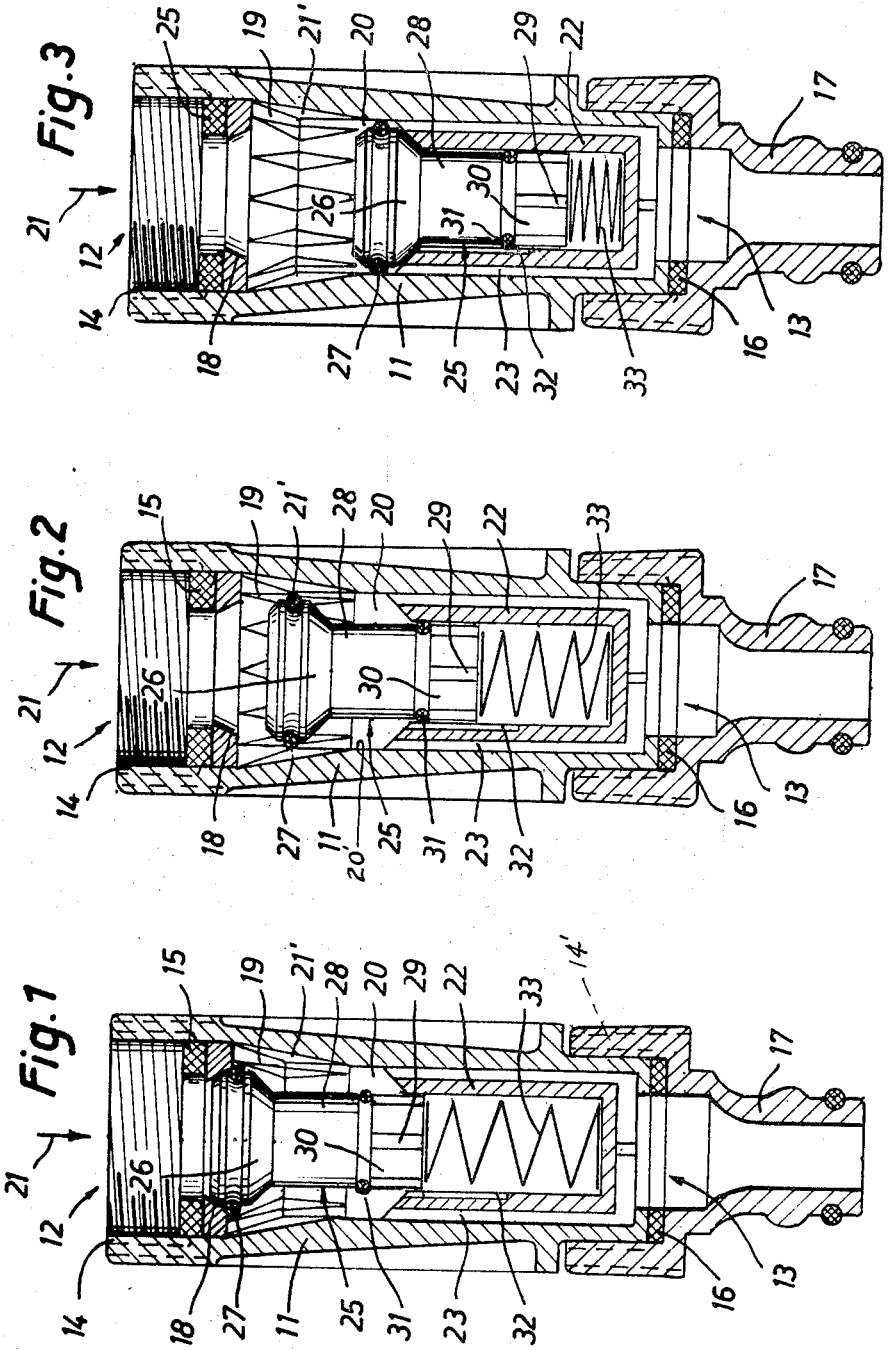

AUTOMATIC VALVE

BACKGROUND OF THE INVENTION

This invention relates to an automatic shut-off valve and, more particularly, to a valve of this type which is responsive to the flow of fluid through the valve housing to allow normal flow there through but which closes to terminate flow when the flow through the housing exceeds a predetermined amount.

A great number of water consuming devices, e.g., domestic machines such as dishwashers, washing machines and the like, are coupled to an external water supply system or other equipment by means of flexible hoses equipped with suitable connections. Typically, flow through the hoses and connections is restricted by a solenoid valve, nozzle or other flow regulating device located in the machine to less than the maximum possible throughput. Hence, if a hose connection comes loose or breaks during operation, large quantities of water can flow out in a very short time, possibly causing extensive damage. As these machines are highly automatic, they are seldom attended during operation. The likelihood of large volumes of water escaping in the event of a connection or hose failure is therefore compounded.

SUMMARY OF THE INVENTION

It is an object of the present invention, therefore, to provide an automatic shut-off valve whose connection is simple and reliable and which closes safely and automatically in the case of excessive flow through the valve without adversely affecting the rest of the fluid system.

These and other objects are attained, in accordance with the invention, by the provision of a valve including a housing having a chamber with a fluid inlet and a fluid outlet, a valve body positioned within the chamber and movable between an upstream open position and a downstream closed position and a spring also located in the chamber for urging the valve body in the upstream direction. Fluid flow is between the valve body and the chamber wall and results in the development of a pressure differential across the upstream and downstream sides of the valve body. During normal volume flow, the spring force balances the pressure difference and holds the valve body in an open position. When the flow volume exceeds a predetermined amount, however, the pressure difference increases until it overcomes the spring force and the valve body moves to the closed position, at which all flow through the valve is shutoff.

If the fluid flow were shutoff too abruptly, the resulting "water shock", or "water hammer", could damage the system. To prevent this a damping device is provided for slowing the movement of the valve body between the normal open position and the closed position. The damping device includes a cup-shaped cylinder disposed in a downstream portion of the chamber, where it receives in longitudinally slidably relation an extension of the valve body. Fluid trapped within the cylinder is permitted to escape in a controlled manner upon downstream travel of the extension, i.e., upon movement of the valve body from the open to the closed position. This damping action allows the valve to close slowly, so that, for example, a few seconds pass until complete shutoff of the flow is effected. Damage due to "water shock" is thus avoided. Although it takes a few seconds for the valve to close in case of excessive flow through the housing, this time is insignificant in view of what might happen if there were no automatic valve for preventing the uncontrolled outflow of water in case of hose or connection damage. Moreover, the damping feature prevents the valve from closing inadvertently if, at the beginning of operation, the amount of fluid consumed by the connected equipment is larger than normal. As long as a certain position of the valve body is not exceeded, the valve opens again automatically after the flow volume returns to normal.

According to another feature of the invention, the valve body cooperates with a non-return or check-valve seat located upstream of the normal open position of the valve body when there is no flow between the inlet and the outlet, thereby preventing reverse flow through the valve. This is particularly desirable feature, for example, with washing machines.

As a further feature of the invention, the flow passage lying opposite the normal open position of the valve body preferably is formed such that as the valve member 25 moves downstream the cross-sectional flow area between the valve body and the chamber wall progressively decreases in size. Then if the flow volume exceeds the predetermined maximum desired, i.e., the maximum which the valve is designed to permit, the closing force acting on the valve body will increase progressively as the valve body moves downstream due to the throttling effect of the decreasing flow area, until complete shutoff is reached.

BRIEF DESCRIPTION OF THE DRAWINGS

An understanding of the invention may be gained from a consideration of the following detailed description of representative embodiments thereof, taken in conjunction with the accompanying figures of the drawings, wherein:

FIG. 1 is a longitudinal sectional view of a valve constructed in accordance with the invention in which the valve body is in the non-return position, i.e., seated against the non-return valve seat;

FIG. 2 is another longitudinal sectional view, showing the valve body in the position assumed during normal volume flow;

FIG. 3 is a sectional view similar to FIGS. 1 and 2, but with the valve body in the closed position;

DESCRIPTION OF A PREFERRED EMBODIMENT

Figure 4:
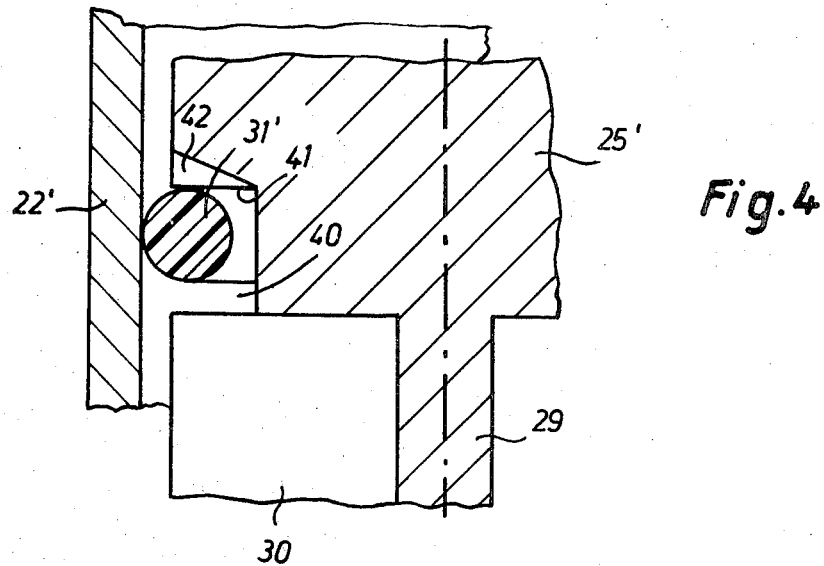
FIG. 4 shows a second embodiment of the damping device of the invention.

In the embodiment illustrated in FIGS. 1 to 3, the automatic valve has a housing 11 of injection-molded plastic having a fluid inlet 12, a fluid outlet 13 and a chamber leading therebetween. The fluid inlet 12 has an internal thread 14 which may be screwed, for example, on to a tap. A washer 15 provides a seal between the tap and the housing 11. The fluid outlet 13 is formed with an external thread 14' corresponding to the internal thread 14, and is adapted to receive a nipple 17 to provide a quick-acting plug connection between the automatic valve and an external hose (not shown). Interposed between the nipple and the main housing 11 is a sealing washer 16.

Inserted in the housing 11, in the region of the inlet 12, is a ring member whose inner surface 18 converges in the upstream direction to form a non-return or check-valve seat, as is more fully described hereinafter. The ring member is held in place by the washer 15. Downstream of the valve seat 18, the housing chamber has a generally conical portion 19, followed by a generally cylindrical portion 20. The walls of the portions 19 and 20 are interrupted by circumferentially spaced recesses 21' in the form of slots.

A cup-shaped cylinder 22, open at the upstream end, is positioned in the chamber portion lying downstream (see arrow 21 for direction of flow) of the cylindrical portion 20. The cylinder 22 has a smaller outer diameter than the inner diameter of the cylindrical portion 20, thereby affording a clearance between the facing walls of the cylinder 22 and the surrounding chamber for the formation of flow passages 23 which connect the cylindrical chamber portion 20 to the fluid outlet 13.

A valve body 25 is slidably mounted in the housing chamber. The valve body 25 is substantially symmetrical with respect to its axis and has a section 26 of enlarged diameter that is conically shaped at each side and which is grooved peripherally at its region of maximum diameter to carry a seal ring 27, conveniently an O-ring of suitable construction. The section 26 is followed by a substantially cylindrical piston-shaped extension 28 of reduced diameter whose downstream section 29 extends into and is guided by the inner wall of the cylinder 22. The guide section 29 is constituted by crosswise arranged ribs between which ports 30 are formed (see also FIGS. 4 and 5). An O-ring 31 is positioned in a circumferential slot between the upstream portion of extension 28 and guide section 29.

In the embodiment shown in FIGS. 1 to 3, there extends over a considerable part of the length of the inner wall of cylinder 22, a recess 32 leading to the open end of the cylinder. The recess 32 functions as an escape port for fluid located in the cylinder 22. A compression spring 33 is positioned in the cylinder 22 and is supported by the bottom of the cylinder and by the guide section 29 of the valve body. The spring always tends to urge the valve body 25 against the direction of flow.

FIG. 1 illustrates the position of the valve body 25 in the absence of flow through the valve from inlet 12 to outlet 13. Under these conditions, the spring 33 urges the valve body 25 in a direction against the direction of flow (arrow 21) so that the O-ring 27 rests against the non-return valve seat 18 and prevents any flow of fluid against the normal direction of flow 21, i.e., in the upstream direction. The guide section 29 guides the valve body 25 in its movement toward and away from the valve seat 18.

When fluid, e.g., water, from a tap or other connection, is permitted to flow in the direction 21, the pressure of the fluid acts upon the upper end of the valve body 25 and forces the valve body downward against the resistance of the spring 33 to an open position, such as that illustrated in FIG. 2. Thereupon, the water flows through the inlet 12, the recesses 21' between the valve body 25 and the housing 11 and the ports 23 to the fluid outlet 13. The preferred open position of the valve body 25 is such that the O-ring 27 is located in the cylindrical chamber portion 20. So positioned, the O-ring 27, and the valve body itself, is guided by the wall portions lying between the recesses 21'. Consequently, knocking or vibrating of the valve body is prevented when at the normal open position.

By providing fluid flow between the enlarged diameter portion 26 of valve body 25 and the housing 11, a flow-throttling or restricting cross section is formed whose respective size is determined by the depth of the recesses 21' at the point where the O-ring 27 is located. Desirably, the recesses 21' are shaped so that the cross-sectional flow area progressively decreases in the downstream direction. In other words, the further downstream the valve body 25 moves, the smaller the flow area becomes. This is accomplished according to the invention by tapering the recesses 21' inwardly in the downstream direction. (See FIGS. 1 to 3).

Throttling of the fluid flow in this manner causes a pressure differential to be developed between the upstream and downstream sides of the valve body portion 26. The spring 33 is chosen so that, in the normal open position of the valve body 25 depicted in FIG. 2, the force of the spring balances this pressure differential, holding the valve body in a stationary state. Since the O-ring 27 is supported by the chamber wall, it remains in the proper position on the valve body 25.

Now, should a failure occur in the water consumer equipment connected to the valve or in the hose leading thereto which, for example, may result when a connection comes loose accidentally, the flow rate through the valve will increase considerably. Because of the increased flow, a greater throttling effect will take place in the annular clearance between the chamber portion 19 and the O-ring 27 and between the recesses 21' and the O-ring 27, with the result that the pressure differential across the valve body portion 26 will increase. Therefore, the spring will be further compressed and the valve body 25 shifted still further in the direction of flow. Because the recesses 21' are tapered in the direction of flow, the throttling is progressive. If the increased flow continues for some time, say a few seconds for example, the valve body will be urged far enough in the direction of flow for the O-ring 27 to reach section 20' of the cylindrical portion 20 of the chamber which section is not interrupted by recesses and which acts as a valve seat for the O-ring. Flow through the valve is thus completely shutoff. This position of the valve body is shown in FIG. 3.

It should be noted that the valve seat formed by section 20' is self-cleaning as a result of the movement of the sealing ring 27 along section 20' during operation of the valve. Hence, any disruption of seal intergrity due to the build-up of foreign matter on the chamber wall at section 20' is avoided.

If the flow through the system suddenly increases, which is probable when the connecting hoses are damaged, the valve body 25 could reach the closed position depicted in FIG. 3 very rapidly, shutting off flow through the valve abruptly. The kinetic energy of the fluid column in front of the valve would then be released in fractions of a second, which could result in a heavy pressure rise in the piping possibly causing damage. To prevent this, provision is made to dampen, or slow, the closing speed of the valve body 25. Upon downstream movement of the valve body 25 from the open position shown in FIG. 2 to the closed position of FIG. 3, the O-ring 31 penetrates into the cylinder 22 and rests against the inside wall of the cylinder, thereby substantially sealing-off its open end. Hence, fluid trapped within the cylinder can escape only through the recess 32. As mentioned, the recess 32 allows a controlled outflow of fluid from the cylinder to the cylindrical chamber portion 20, and in this way prevents any sudden closure of the valve. A typical closing time might, for example, range between 3 to 10 seconds.

Again, the foregoing damping structure also prevents any short-time increase of flow, which might occur when the water consuming equipment is initially filled to operating condition, from resulting in a closure of the valve. This result can be achieved by suitably designing the valve body 25, the chamber portions 19 and 20 and the recesses 21' as well, such that if the increased flow diminishes shortly before the valve body is in its final closed position, the force of the spring 33 again prevails and returns the valve body 25 to the open position illustrated in FIG. 2.

Since the ports 30 in the guide section 29 allow fluid flow out of the cylinder 22 during movement of the valve body 25 from the position shown in FIG. 1 to the normal open position portrayed in FIG. 2, excessive damping of the movement of the valve body 25 in the normal open operating range is prevented. Under certain circumstances, however, a certain amount of damping may be desirable in order to prevent "knocking" of the valve body.

FIG. 4 shows a second embodiment of the damping structure of the invention. In this embodiment, the cylinder 22', corresponding to cylinder 22 in FIGS. 1 to 3, has no wall recess 32. The seal 31' in the form of an O-ring lies in a groove 40, whose width and depth are each greater than the diameter of the O-ring (viewed in cross section). The depth is so large that, where the seal 31' engages the cylinder 22', the inner diameter of the O-ring does not bear against the inner wall of the groove, i.e., the dimension of the inner wall of the groove is less than the inner dimension of the O-ring. Thus, the fluid in cylinder 22', which in FIG. 4 presses from below against the O-ring, can penetrate into the groove 40. On downstream movement of the valve body 25', the O-ring 21' is urged by the force of the fluid flowing beneath it into sealing engagement with the upstream sides of the groove 40. Formed in the upstream side 41 are one or more recesses 42 which connect the interior of the groove 40 with the space between the valve body 25' and the cylinder 22' upstream of the O-ring 31'. The recess or recesses 42 provide an escape passage or passages through which the fluid can flow out of the cylinder in a controlled manner. Movement of the valve body 25' is therefore damped as it moves toward the closed position. The capability of the O-ring 31' to "float" within the groove 40 and the flow of fluid through the groove have the advantage of purging the O-ring 31' of foreign matter which otherwise might be deposited thereon and interfere with its operation. In the same manner, the flow through the groove 40 and the recess or recesses 42 keeps them free from impurities. This feature is particularly important because in the usual situation the valve will be required to close very rarely, i.e., only in an emergency, but then effectively so as to prevent any damage.

Figure 5:
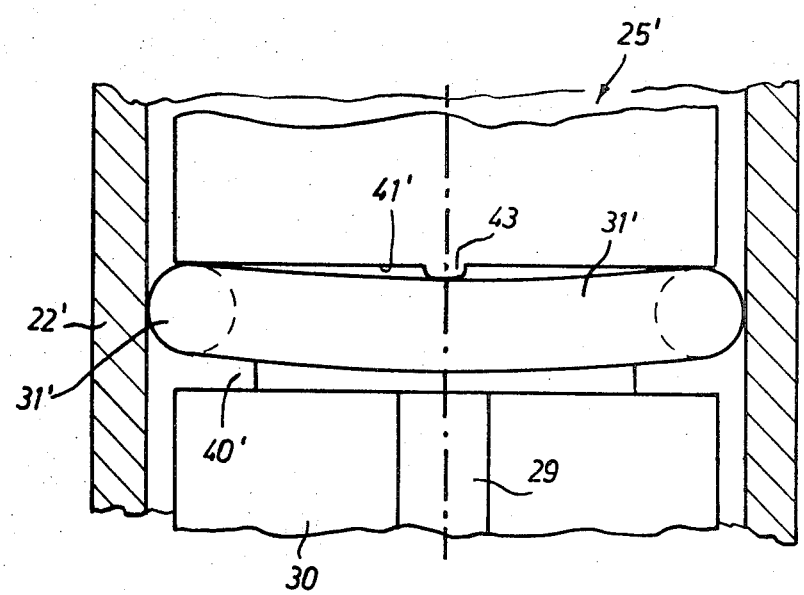
FIG. 5 shows a third embodiment of the damping device.

FIG. 5 shows yet another embodiment of a damping device. The cylinder 22', the sealing ring 31', and the dimensions of the groove 40' are essentially the same as in FIG. 4. Instead of a recess or recesses 42, however, one or more projections 43 are provided on the upstream side 41' of the groove 40'. Here, too, the lifting of the sealing ring from the side 41' produces a fluid escape passage which constantly is self-cleaning.

Furthermore, an escape passage may be provided to advantage by forming a downwardly and inwardly inclined rib, preferably of an irregular triangular shape, extending axially along and perpendicularly from the inner wall of the cylinder 22'. The lower surface of the rib would extend essentially radially from the cylinder wall, and as the valve body moved downward, the rib would force a portion of the O-ring 31', which may also be "floating", away from the cylinder wall thereby forming a leakage path for the fluid. The O-ring 31' would not be damaged as it would ride down the inclined surface which is essentially parallel to the axis of the cylinder.

The above hydraulic damping devices have been found to be so advantageous that, in the embodiments of FIGS. 4 and 5, for example, any influence of friction was largely eliminated. In this regard, it should be noted that the influence of friction must also be considered for damping and may be used therefor.

It will be appreciated from the foregoing that the automatic shutoff valve of the invention affords many advantages, including a relatively simple, low cost construction. With the exception of the spring 33, for instance, it can be fabricated of parts which are made chiefly of injection-molded plastic. In this connection, it is very advantageous if, instead of being separate as in the embodiment shown in FIGS. 1 through 3, the nipple 17 is integrally molded to the housing, thereby simplifying the flow conditions. Moreover, the provision for straight flow through the valve without any major alterations in the flow direction limits the pressure drop and also contributes to the simplified construction of the valve.

Assembly and disassembly for cleaning or any performance testing which may be necessary are also very simple. Thus, the cylinder 22, the spring 33 and the valve body 25 may be simply inserted into the housing from the fluid inlet 12 and thereafter held in place by insertion of the ring member carrying valve seat 18.

It will be understood by those skilled in the art that the above-described embodiments are intended to be merely exemplary, in that they are susceptible of modification and variation without departing from the inventive concepts disclosed. For example, instead of employing wall recesses 32, the flow passages required for damping may also be achieved by providing bores in the valve body or in the cylinder.

Although the additional function of the valve as a non-return or check valve is very advantageous, the valve seat 18 may be omitted or suitably pierced if the non-return function is not desired, so that the water can freely flow through the valve in the reverse direction. Modifications may also be made to the design of the restricting cross section which provides for throttling of the fluid flow. Conical chamber portion 19, for example, may be smaller than in the embodiments shown or even omitted altogether; it is advantageous, however, if the valve can move freely for at least a little distance before the O-ring 27 comes into engagement with the cylindrical portion 20'. Also, by changing the cross-sectional distribution of the flow passages in the axial direction the mode of operation of the valve may be varied within wide limits. Aside from the size of the cross sections, which determines the "point of change", i.e., the position of flow volume at which the transition to the closed position takes place, the "point of change" may also be varied within limits by a nonlinear design of the taper of the restricting cross sections or by steps in these cross sections. It is to be noted further that the "point of change" is also influenced by the strength of the spring, so that an adjustment of the desired flow volume may be effected within certain limits by utilizing springs of different strengths. On the other hand, by the aforementioned cross-sectional changes, e.g., by a first higher and then lower degree of taper of the cross section, the effect of the spring strength and the closing speed can be diminished. All such variations and modifications, therefore, are intended to be included within the spirit and scope of the invention as defined in the appended claims.

We claim:

1. An automatic shut-off valve comprising:
    a housing having a chamber with a fluid inlet and a fluid outlet;
    a valve body located within the chamber and being movable between an upstream open position and a downstream closed position, the valve body having an upstream portion of enlarged diameter and a downstream extension of smaller diameter;
    means defining a cup-shaped cylinder in a downstream portion of the chamber, the cylinder being open to the chamber at the upstream end and the smaller diameter extension of the valve body being slidably received therein;
    means defining at least one, first flow passage between the valve body and the chamber opposite the upstream open position in flow communication with the fluid inlet;
    means defining at least one, second flow passage between the cylinder and the chamber in flow communication with the fluid outlet and, when the valve body is at the open position, with the first flow passage;
    seal means carried in part by the enlarged diameter portion of the valve body for shutting off fluid flow between the first and second flow passages when the valve body is at the closed position;
    spring means for urging the valve body against the direction of flow so as to maintain the valve body at the open position under normal flow through the valve but to permit the valve body to move to the closed position when the flow exceeds a predetermined maximum quantity; and
    means for permitting controlled fluid escape from the cylinder upon downstream movement therein of the smaller diameter extension of the valve body, thereby to afford a damping action on the movement of the valve body from the open to the closed position.

2. An automatic valve according to claim 1, further comprising valve seat means within the chamber upstream of the open position for coacting with the enlarged portion of the valve body to prevent fluid flow through the valve in the upstream direction, the valve body being movable into sealing engagement with the valve seat means by the spring means in the absence of fluid flow in the downstream direction.

3. An automatic valve according to claim 1, further comprising valve seat means within the chamber upstream of the open position for coacting with the seal means carried by the enlarged diameter portion of the valve body to prevent fluid flow through the valve in the upstream direction, the valve body being movable into sealing engagement with the valve seat means by the spring means in the absence of fluid flow in the downstream direction.

4. An automatic valve according to claim 1, wherein the means defining the first flow passage comprises at least one recess in the chamber wall.

5. An automatic valve according to claim 1, wherein the first flow passage has a progressively decreasing cross-sectional flow area between the valve body and the chamber wall in the direction of flow.

6. An automatic valve according to claim 5, wherein the means defining the first flow passage comprises a plurality of recesses in the chamber wall.

7. An automatic valve according to claim 6, wherein the means defining the first flow passage further comprises chamber-wall portions lying between the recesses, the chamber-wall portions guiding the valve body during at least a portion of the movement thereof from the open to the closed position.

8. An automatic valve according to claim 1, wherein the seal means includes a peripheral seal member carried by the enlarged diameter portion of the valve body and dimensioned to coact with the chamber wall to shut off fluid flow when the valve body is at the closed position.

9. An automatic valve according to claim 8, wherein the valve body has a generally circular cross-section, the peripheral seal member comprises an O-ring and the portion of the chamber wall with which the seal member coacts is generally cylindrical.

10. An automatic valve according to claim 8, further comprising valve seat means within the chamber upstream of the open position for coacting with the peripheral seal member on the valve body to prevent fluid flow through the valve in the upstream direction, the peripheral seal member being movable into engagement with the valve seat means by the spring means in the absence of fluid flow in the downstream direction.

11. An automatic valve according to claim 10, wherein at least portions of the peripheral seal member contact the chamber wall as the valve body moves between the open position and the closed position so as to guide the movement of the valve body.

12. An automatic valve according to claim 1, wherein the means for permitting controlled fluid escape from the cylinder comprises at least one recess in the cylinder wall.

13. An automatic valve according to claim 1 further comprising:
    an annular groove formed on the outer periphery of the smaller diameter extension of the valve body;
    a seal ring positioned in the annular groove for cooperating with the wall of the cylinder upon movement of the valve body to the closed position, the outer dimension of the inner wall of the annular groove being smaller than the inner dimension of the seal ring and the dimension of the groove in the direction of flow being larger than the corresponding dimension of the seal ring, whereby the seal ring does not rest against the inner wall of the groove nor the downstream side of the groove when the seal ring is moved downstream within the cylinder.

14. An automatic valve according to claim 13, wherein the means for permitting controlled fluid escape from the cylinder includes means associated with the upstream side of the annular groove for permitting fluid flow past the inner side and upstream side of the seal ring to the region of the cylinder upstream of the seal ring.

15. An automatic valve according to claim 14, wherein the means associated with the upstream side of the groove comprises a recess formed in the upstream groove side in flow communication with the region of the groove behind the seal ring and the region of the cylinder upstream of the seal ring.

16. An automatic valve according to claim 14, wherein the means associated with the groove means comprises a projection extending downstream from the upstream groove side so as to prevent at least a portion of the seal ring from making sealing engagement with the upstream side.

17. An automatic valve according to claim 1, wherein the smaller diameter extension of the valve body includes a section which cooperates with the cylinder inner wall for guiding the valve body.

18. An automatic valve according to claim 1, further comprising a quick-connection nipple carried by the housing at the downstream end thereof.

19. An automatic valve according to claim 1, wherein the housing is a substantially cylindrical body, the chamber comprises a central bore, the cylinder is dimensioned with an outer diameter less than the diameter of the chamber and is positioned concentrically within the bore, and the second flow passage comprises the space between the cylinder and the chamber wall.

* * * * *